United States Patent [19]
Wada et al.

[11] Patent Number: 5,710,570
[45] Date of Patent: Jan. 20, 1998

[54] INFORMATION PROCESSING UNIT HAVING DISPLAY FUNCTIONS

[75] Inventors: Hiroshi Wada, Fujisawa; Jun Kitahara, Yokohama; Yoshiaki Nomura, Kawasaki; Mariko Hara, Yokohama, all of Japan

[73] Assignee: Hitachi, Ltd., Tokyo, Japan

[21] Appl. No.: 404,427

[22] Filed: Mar. 15, 1995

[30] Foreign Application Priority Data

Aug. 26, 1994 [JP] Japan ................................ 6-201748

[51] Int. Cl.⁶ .............................. G09G 3/36; G09G 5/00
[52] U.S. Cl. .................................................. 345/3
[58] Field of Search ............................. 345/3, 211–213

[56] References Cited

U.S. PATENT DOCUMENTS

| | | | |
|---|---|---|---|
| 5,297,286 | 3/1994 | Uehara | 395/700 |
| 5,491,496 | 2/1996 | Tomiyasu | 345/3 |
| 5,559,525 | 9/1996 | Zenda | 345/3 |

FOREIGN PATENT DOCUMENTS

| | | |
|---|---|---|
| 2-64693 | 3/1990 | Japan . |
| 4-122985 | 4/1992 | Japan . |
| 5-173524 | 7/1992 | Japan . |

*Primary Examiner*—Jeffery Brier
*Attorney, Agent, or Firm*—Antonelli, Terry, Stout & Kraus LLP

[57] ABSTRACT

An information processing unit that can switch between a simultaneous display state of the same screen by a CRT display and a liquid crystal display and a display state by only the liquid crystal display, by using a display frequency suitable for each of the display state without the necessity for re-activation of a system. The kind of usable displays is displayed on a setup screen of the liquid crystal display and a user selects a desired display. A display controller generates display signals having display frequencies suitable for the selected displays, and effects screen display of the CRT display and the liquid crystal display. Further, commands for setting the specification of the display controller are stored in advance into a BIOS ROM and a HD. When the command is executed through an input device during the use of the system, the command is executed for the display controller and the display specification is changed.

18 Claims, 14 Drawing Sheets

FIG.8

— DATE —

JUNE 20, '94

— FILE DEVICE —

(1) FDD
 (2) HDD

— SERIAL
  PRINTER PORT —

(1) SERIAL PRINTER PORT 1 : COM1
(2) SERIAL PRINTER PORT 2 : COM2

— VIDEO —

VIDEO BOARD : MAIN BODY

— POWER
  MANAGEMENT

YES

— DISPLAY —

(1) LCD : ON
(2) CRT : OFF

INFORMATION PROCESSING UNIT HAVING DISPLAY FUNCTIONS

BACKGROUND OF THE INVENTION

This invention relates to an information processing unit such as a personal computer. More particularly, it relates to an information processing unit capable of simultaneously displaying the same screen on both CRT display and liquid crystal display.

In customer services at the counter of a stock company, an insurance company, etc., in conventional systems, only one terminal is available and an attendant and a client must watch one screen in unnatural postures as depicted in FIG. 14. Accordingly, the screen is difficult to watch and both the client and the attendant are likely to get tired. To cope with this problem, a system which allocates two terminals to the client and the attendant and displays the same screen on two terminals has become predominant. If both terminals are CRT displays having a large screen, space requirement becomes great, and if they are compact liquid crystal panels, on the other hand, the screen is difficult to watch particularly for elderly clients. For this reason, a system in which the attendant talks to the client while watching the screen of the liquid crystal panel assembled into a notebook type personal computer, and a CRT display having a large screen and connected to the personal computer through a cable as shown in FIG. 15 is allocated to the client has become most popular at present.

JP-A-62-251795 discloses a simultaneous display system on both the CRT display and the liquid crystal display. According to this prior art, display signals LD0 to LD7, UD0 to UD7, etc., to the liquid crystal display are generated from display signals VSYNC, HSYNC, CK, R, G and B to the CRT display, so as to accomplish simultaneous display of the same screen on the CRT display and the liquid crystal display.

To simultaneously display the same screen on both the liquid crystal display and the CRT display, the frame frequencies of the two displays must be made equal. The frame frequency of the CRT displays available at present on the market is primarily 60 Hz, but this frame frequency of 60 Hz is so low for an STN (Super-Twisted Nematic) liquid crystal that flicker occurs on the screen. For this reason, a TFT (Thin Film Transistor) liquid crystal panel which does not relatively induce flicker even at the frame frequency of 60 Hz is used in many cases.

When a client comes to the office while the liquid crystal display alone is used without using the CRT display and the screen must be displayed on the CRT display, too, the power supply of the personal computer is once turned OFF and the system is again activated, and the display signal to the CRT display is set to enable by setup during the re-activation of the system.

Incidentally, JP-A-4-57018 describes the technology of setting the frame frequency of the STN liquid crystal display to 80 to 300 Hz, and JP-A-3-174116 teaches to set the frame frequency to 200 to 280 Hz.

SUMMARY OF THE INVENTION

In the prior art technologies described above, the display signals to the liquid crystal display are generated from the display signals which are in match with the CRT display. Therefore, the frequency of the display signal to the liquid crystal display becomes lower than the real capability of the response time of liquid crystal pixels. When the frequency becomes a lower speed, ON/OFF switching of the liquid crystal pixels remain as a lag or after-image, so that flicker occurs on the screen. Because the display signals to the liquid crystal display are generated from the display signals to the CRT display, it has been difficult to increase the speed of the frequency of the display signals so as to eliminate flicker.

When the frequency of the display signal is set in match with the response time of the liquid crystal, the data transfer time to the CRT display becomes shorter, and simultaneous display with the CRT becomes impossible in consequence.

To cope with the problem of flicker, the TFT liquid crystal panel is used in most cases in the customer services described already but because the TFT liquid crystal panel is expensive, the economical STN liquid crystal panel is preferably used instead. However, no counter-measures have been taken to cope with flicker when the STN liquid crystal panel is used.

When a client appears while the liquid crystal display alone is being used, another problem occurs that the client has to await for a long time because the power supply of the personal computer is once cut off and the system is to be again activated.

It is an object of the present invention to provide a display signal control method which can select displays to be used and the driving frequency which matches with the display selected, and an information processing unit employing such a method, without the necessity for reactivating the system.

It is another object of the present invention to provide a display signal control method which allows a user to choose a display to be used and generates a display signal having a frequency corresponding to the selection result, and an information processing unit for executing the method.

To accomplish the objects described above, an information processing unit equipped with a display signal control system according to one aspect of the present invention activates a setup routine for determining specifications of various devices during a system start-up processing (hereinafter referred to as the "boot processing") which is executed after turning-on of the power supply. An item for selecting a display to be used is displayed on the setup screen. A clock generator is provided in a display controller and generates display signals having a frequency corresponding to the selection result.

According to another aspect of the present invention, one of the I/O addresses is allocated as an I/O port to one of the pins of a connector for connecting a CRT display, and whether or not the CRT display is connected is detected from the voltage level of the I/O port by reading the I/O port during the setup routine executed after turning-on of the power supply. The display controller generates a display signal having a frequency corresponding to this detection result.

According to still another aspect of the present invention, a setup routine for setting the display specification to the display controller in the case where both of the liquid crystal display and the CRT display are used (first case) and another setup routine in the case where only the liquid crystal display is used (second case), are stored in advance in an external memory such as a hard disk and in a nonvolatile memory, respectively, and are switched in accordance with given situations.

When both of the CRT display and the liquid crystal display are selected on the setup screen, the display controller sets the frequency of the display signals to that of the CRT display. In contrast, when only the liquid crystal display is selected, the display controller invalidates the display signals to the CRT display and sets the frequency to the frequency of the display signals to the liquid crystal display.

When only the liquid crystal display is selected, the display signals to the CRT display are invalidated and the frequency of the display signals to the liquid crystal display is set to a high speed. Accordingly, flicker on the display screen can be suppressed.

Setting at the time of the system start-up becomes unnecessary by detecting the connection to the CRT display by reading the signal in the connecter, and switching the frequency.

When it becomes necessary to display the screen on the CRT display, too, such as when a client appears while an attendant is using only the liquid crystal display, a setup routine similar to the one during the boot processing is activated and both of the displays are selected. Then, the display specification setting commands in the first case, which are stored in the hard disk, are executed for the display controller. As a result, the display controller lowers the frequency of the display signals to the liquid crystal display and generates the display signals to the CRT display.

In this way, it becomes unnecessary to again activate the system by once turning OFF the power supply, and the display to be used can be switched. Accordingly, the images can be displayed instantaneously on the CRT display for the client without keeping the client waiting for a long time.

BRIEF DESCRIPTION OF THE DRAWINGS

FIG. 8 shows an example Of the setup screen in an embodiment of the present invention;

DESCRIPTION OF THE PREFERRED EMBODIMENTS

Hereinafter, preferred embodiments of the present invention will be explained with reference to the drawings.

Figure 1:
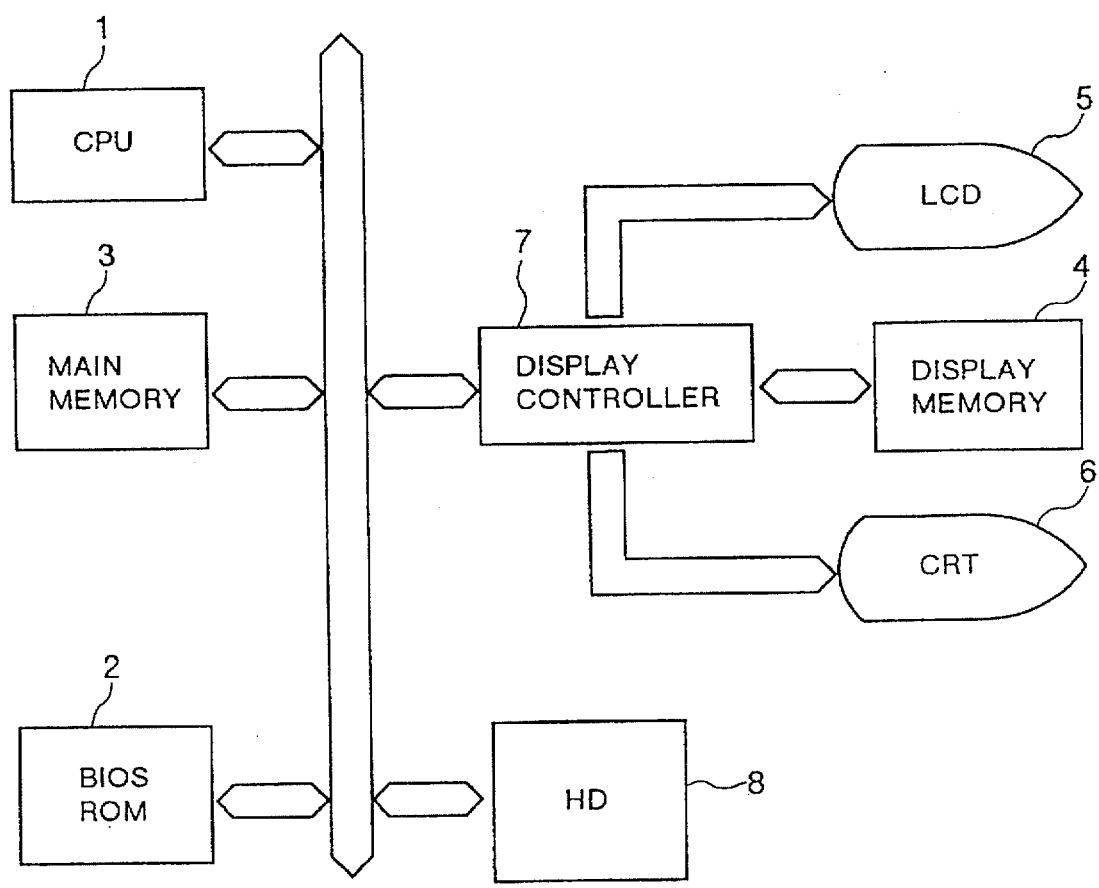
FIG. 1 is a block diagram of an information processing unit to which the present invention is applied.

FIG. 1 is a block diagram showing an internal structure of an information processing unit as typified by a personal computer. In FIG. 1, reference numeral 1 denotes a central processing unit (hereinafter referred to as the "CPU") which gives commands to each block of the information processing unit and controls the whole unit. Reference numeral 2 denotes a non-volatile memory (hereinafter referred to as the "BIOS ROM") storing a group of commands necessary for boot processing, and reference numeral 3 denotes a main memory for temporarily storing various data generated by the information processing unit during its operation. Reference numeral 4 denotes a display memory for displaying data on a display and reference numeral 5 denotes a liquid crystal display for displaying the data stored in the display memory 4. This liquid crystal display 5 is of a dual scan STN (Super-Twisted Nematic) type. Reference numeral 6 similarly denotes a CRT display. Reference numeral 7 denotes a display controller for generating signals necessary for displaying the display data stored in the display memory 4 on the liquid crystal display 5 and the CRT display 6, and reference numeral 8 denotes a hard disk (hereinafter referred to as the "HD") for storing used and application programs. These members are mutually connected through buses. Needless to say, this information processing unit further includes input means such as a keyboard, not shown.

After the power supply is turned ON, the CPU 1 sequentially reads and executes the commands stored in the BIOS ROM 2, and the operation specification of each block of the information processing unit is determined. Thereafter, the CPU 1 executes the commands designated by the user and application programs, and during execution, stores the data to be outputted to the liquid crystal display 5 and to the CRT display 6, in the display memory 4 through the display controller 7.

The display controller 7 sequentially reads out the data stored in the display memory 4 while regulating the access from the CPU 1, and generates the display signals to the liquid crystal display 5 and to the CRT display 6. Finally, the liquid crystal display 5 and the CRT display 6 display the display signals from the display controller 7 on the display.

Figure 2:
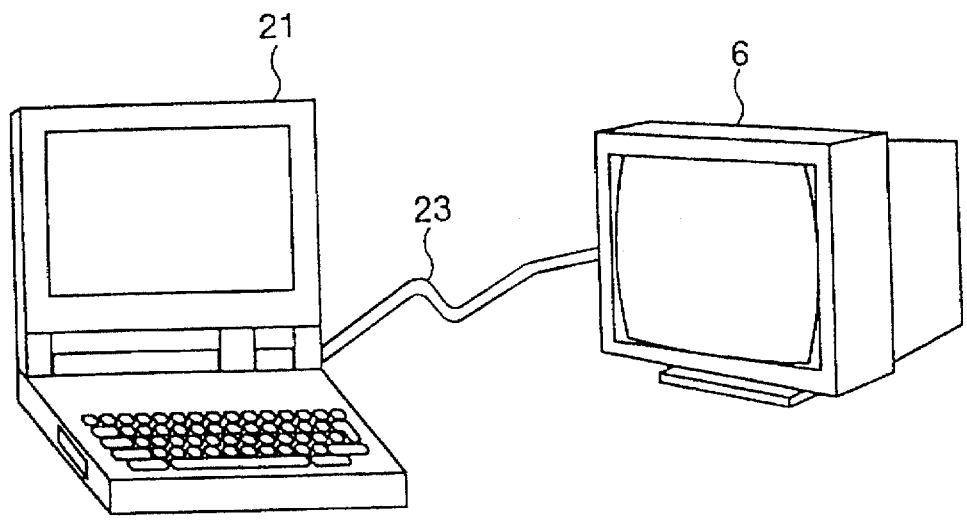
FIG. 2 is a perspective view showing an example of the apparatus construction for accomplishing the present invention.

FIG. 2 shows an example of the apparatus construction to which the present invention is applied. Reference numeral 21 denotes a personal computer typified by a notebook type personal computer which incorporates the structure shown in FIG. 1. Reference numeral 23 denotes a cable for transferring the display signals from the personal computer 21 to the CRT display 6. In FIG. 2, the personal computer 21 generates those display signals which are necessary for displaying the same screen as the screen displayed on the liquid crystal display 5, on the CRT display 6.

Next, the display system of the CRT display 6 will be explained in further detail with reference to FIGS. 3 and 4 and the display system of the liquid crystal display 5, with reference to FIGS. 5 to 7.

Figure 3:
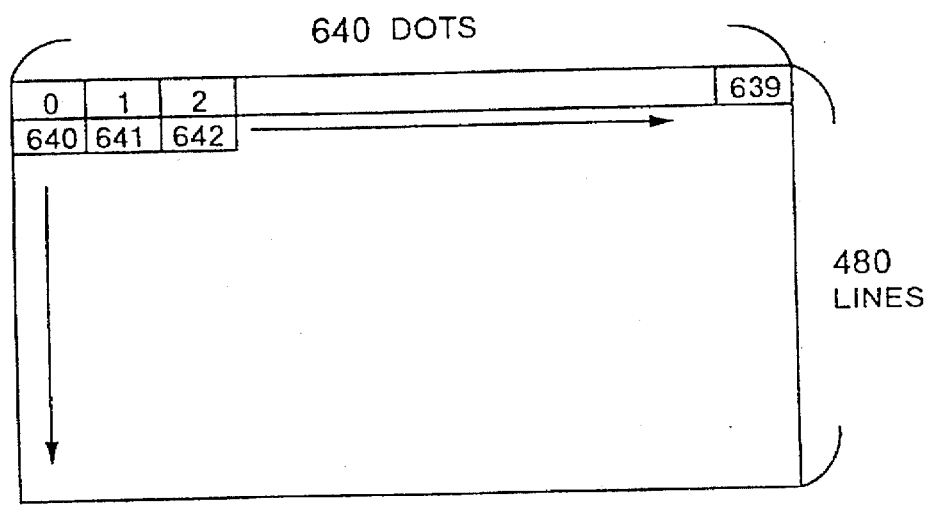
FIG. 3 shows an example of the display system of a CRT display.

FIG. 3 shows a screen structure of the CRT display. The CRT screen employs the structure of 640 dots in the horizontal direction and 480 lines in the vertical direction as shown in FIG. 3. These dots are numbered as dot 0, dot 1, dot 2, ..., dot 639 from the upper left corner of the screen as the origin to the right-hand portion in the horizontal direction. The dot 640 is positioned at the extreme left of the line immediately below the first line. In other words, one horizontal line comprises 640 dots as a unit. When scanning of one horizontal line is finished, the next lower line is repeatedly scanned from the extreme left. After 480 lines are scanned in this way, scanning is again made from the extreme left of the upper-most line.

Figure 4:
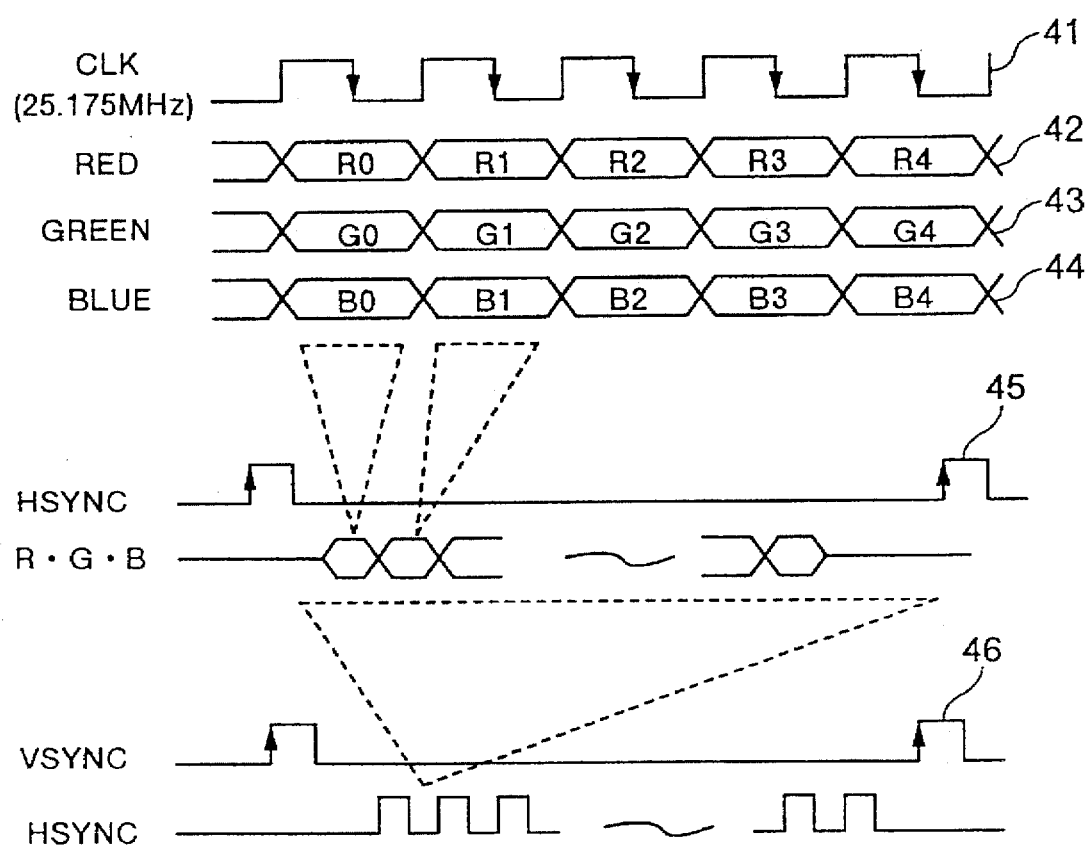
FIG. 4 shows an example of a display signal generation system to the CRT display.

FIG. 4 shows the display signal generation method of the display controller 7. The display controller 7 outputs six signals in total, i.e. CLK 41, RED 42, GREEN 43, BLUE 44, HSYNC 45 and VSYNC 46, to the CRT display 6. One dot of the CRT screen is expressed by the voltage levels of three signals, that is, RED, GREEN and BLUE, and the dot 0 in FIG. 3 is expressed by the voltage levels of R0, G0 and B0. CLK 41 is a dot clock, and the CRT display 6 receives the voltage levels of RED, GREEN and BLUE at the fall of this signal CLK 41 and expresses the color corresponding to the voltage levels.

HSYNC 45 is a horizontal sync signal. The CRT display 6 determines completion of scanning of one horizontal line at the rise of this signal and starts scanning the next line below the former. RED, GREEN and BLUE data for 640 dots are generated between two rise timings of this HSYNC 45 signal.

VSYNC 46 is a horizontal sync signal. The CRT display 6 determines completion of scanning of one screen at the rise of this signal and starts scanning the next screen. The HSYNC signal for the 480 lines is generated between two rise timings of this VSYNC signal. The frequency of CLK 41 is unified ordinarily to 25.175 MHz (frame frequency: 60 Hz).

Figure 5:
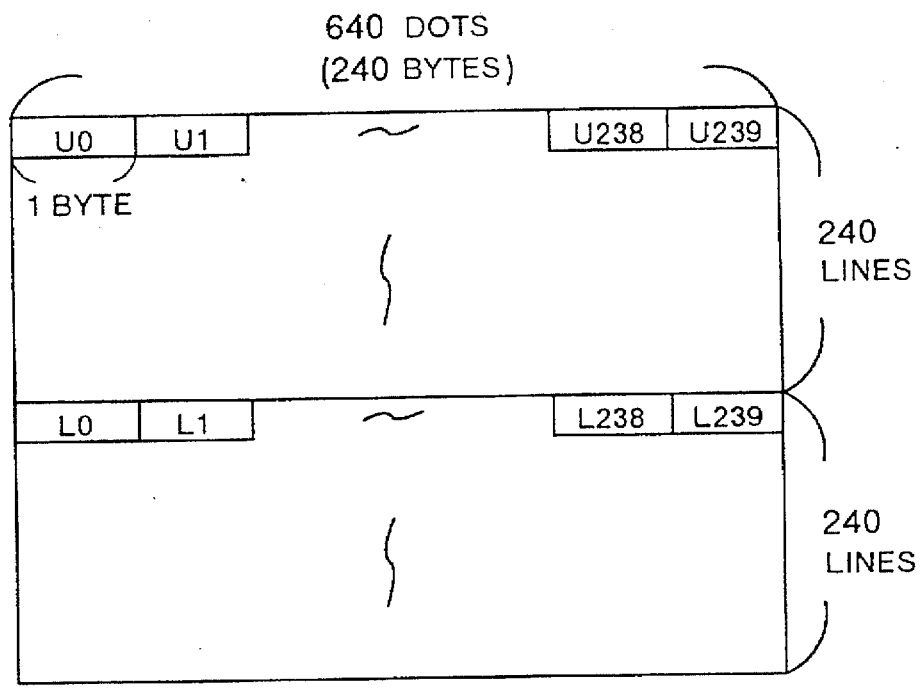
FIG. 5 shows an example of the display system of the liquid crystal display.
Figure 6:
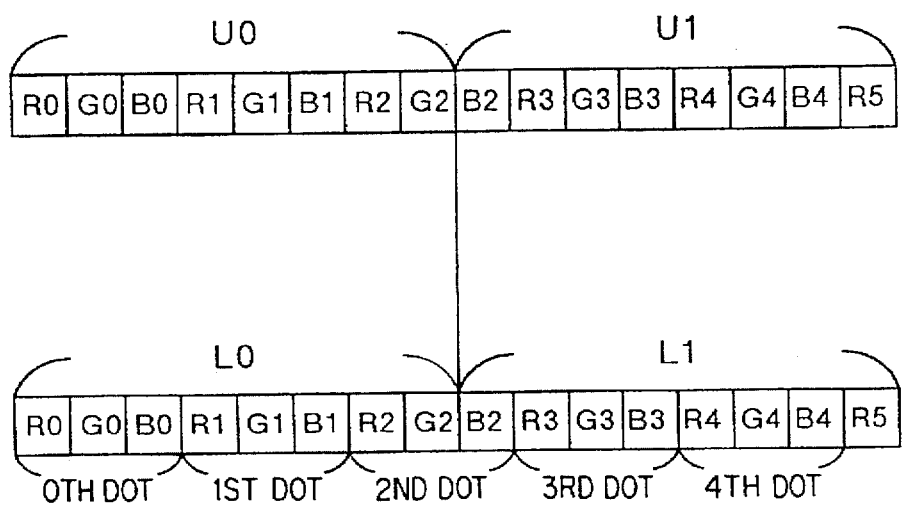
FIG. 6 shows an example of the display data structure.

FIG. 5 shows the display system of the liquid crystal display 5. The screen is divided into two, upper and lower segments each comprising 240 lines, and the display data is sequentially transferred from the upper left corner (U0, L0) of the two screens to the right, and 240 bytes (or 640 dots) per horizontal line are transferred. Since one dot is expressed by R, G and B three bits as shown in FIG. 6, 640×3 (R, G, B) ÷8=240 (bytes).

Data is transferred to the liquid crystal display 5 in units of 16 bits in order of U0 and L0, U1 and L1, . . . , and so forth, sequentially. The detail of U0 and L0 is shown in FIG. 6. Namely, U0 comprises R0, G0, B0 of the 0th dot of the upper panel, R1, G1, B1 of the first dot and R2, G2 of the second dot, and U1 comprises B2 of the second dot, R3 of the third dot, R3, G3, B3 of the third dot, R4, G4, B4 of the fourth dot and R5 of the fifth dot. Both L0 and L1 comprise the R, G and B data from the 0th dots of the lower panel in the same way as U0 and U1.

Figure 7:
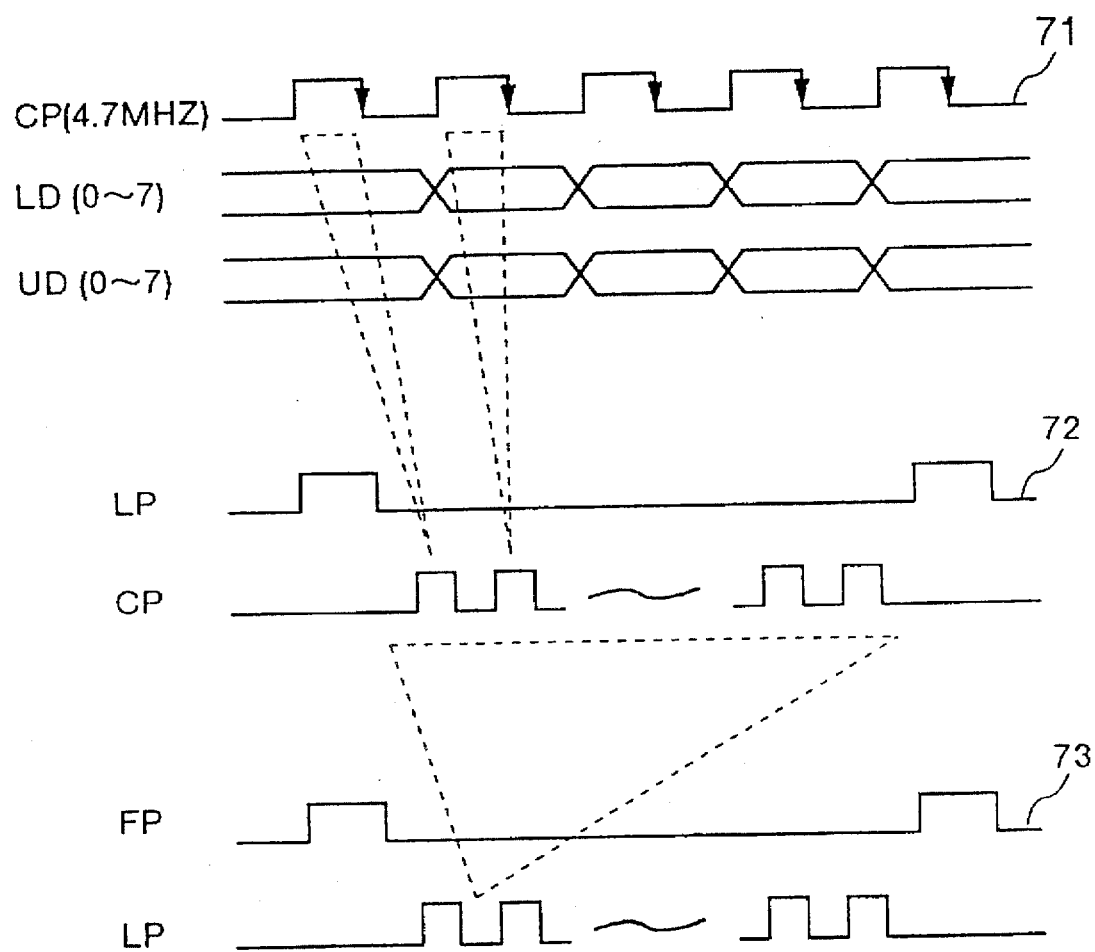
FIG. 7 shows an example of a display signal generation system to the liquid crystal display.

FIG. 7 shows a display signal generation method of the display controller 7. The display controller 7 outputs five kinds, in total, of signals, that is, CP71, LD0 to LD7, UD09 to UD7, LP72 and FP73, to the liquid display 5.

CP71 is a shift clock, and the liquid crystal display 5 receives the data of LD0 to LD7 and UD0 to UD7 at the fall of this signal. LP72 is a line pulse, and the liquid crystal display 5 determines completion of display of one horizontal line of both upper and lower panels at the rise of this signal, and starts displaying the next lower line. CP71 for receiving LD0 to LD7 and UD0 to UD7 for 240 times is generated between the two rise timings of LP72. FP73 is a frame pulse, and the liquid crystal display 5 determines completion of display of one screen at the rise of this signal and starts displaying the next screen. LP72 for 240 lines is generated between the two rise timings of FP73.

The frequency of CP71 is approximately 4.7 MHz for effecting simultaneous display with the CRT display 6 for the following reason.

The frequency of the dot clock of the CRT display 6 is generally 25.175 MHz, and to transfer one dot by one clock, the transfer time per dot is 39.7 ns. In contrast, if the frequency of CP71 of the liquid crystal display 5 is X MHz, one clock is 1,000/X ns. Since 16 bits (16/3 dots) per clock are transferred to the liquid crystal display 5, the transfer time per dot is 3,000/16X ns. In order to have the CRT display 6 and the liquid crystal display 5 to simultaneously make display, these two transfer times must be equal to each other. Accordingly, the frequency X is approximately 4.7 by solving the equation 39.7≈3,000/16X.

Next, a definite method for determining the display specification will be explained in detail with reference to FIG. 8.

Whether or not a setup routine is used to change the specifications of various apparatuses is displayed and designated during system start-up processing.

When a key corresponding to the selection of the setup routine is pushed, a setup screen shown in FIG. 8 is displayed. When no key is pushed or when a key not corresponding to the selection of the setup routine is pushed, the setup routine screen is not displayed, and the system start-up processing is continued.

FIG. 8 shows an example of the setup screen displayed by the setup routine after the power supply is turned ON in a personal computer 21 using the display signal control system according to the present invention. An item for selecting and designating a display to be used is provided to the setup screen, and the user of this computer is allowed to select whether or not each of the built-in liquid crystal display 5 and the outer CRT display is used.

Figure 9:
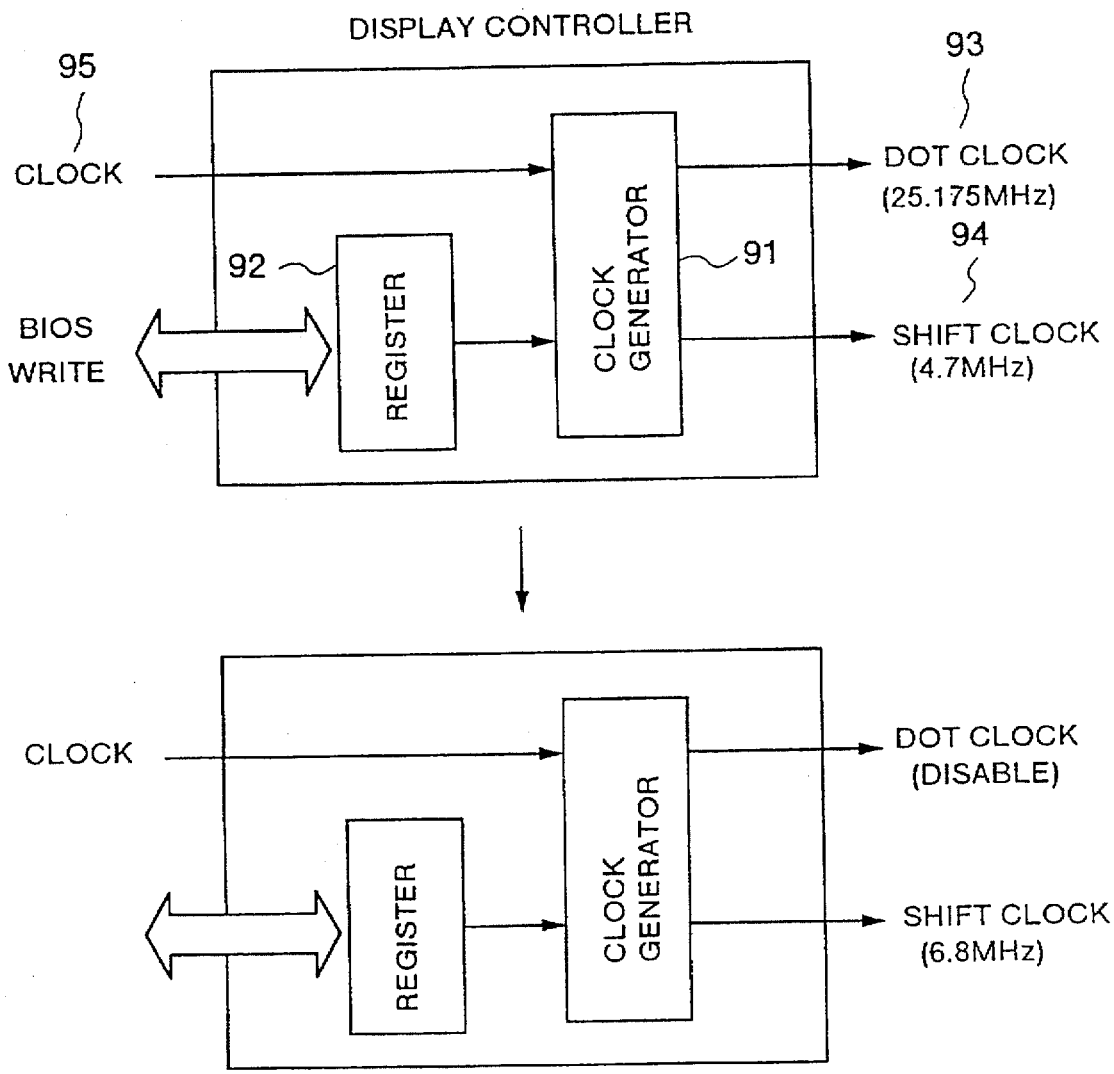
FIG. 9 shows the construction and operation of a clock generator in another embodiment of the present invention.

As shown in FIG. 9, the display controller 7 incorporates therein a clock generator 91 for generating the shift clock CP71 to the liquid crystal display 5 and the dot clock CLK41 to the CRT display 6. Here, the clock 95 is a basic clock for operating the display controller 7. The CPU 1 writes the value, which is determined by the selection result of the display on the setup screen, into a register 92 in the display controller 7 in accordance with the setup routine inside the BIOS ROM through the system bus.

The clock generator 91 incorporates therein a PLL (Phase Locked Loop), and can determine the frequencies of the dot clock 93 and the shift clock 94 in accordance with the value of the register 92. When both of the CRT display 6 and the liquid crystal display 5 are selected, for example, the frequencies of the dot clock 93 and the shift clock 94 are 25.17 MHz and 4.7 MHz, respectively. When only the liquid crystal display 5 is selected, it need not be displayed simultaneously with the CRT display 6, so that the dot clock is invalidated and the shift clock is set to a high speed (for example, 6.8 MHz). Accordingly, when only the liquid crystal display 5 is used, flicker of the liquid crystal display screen can be reduced to minimum.

Figure 10:
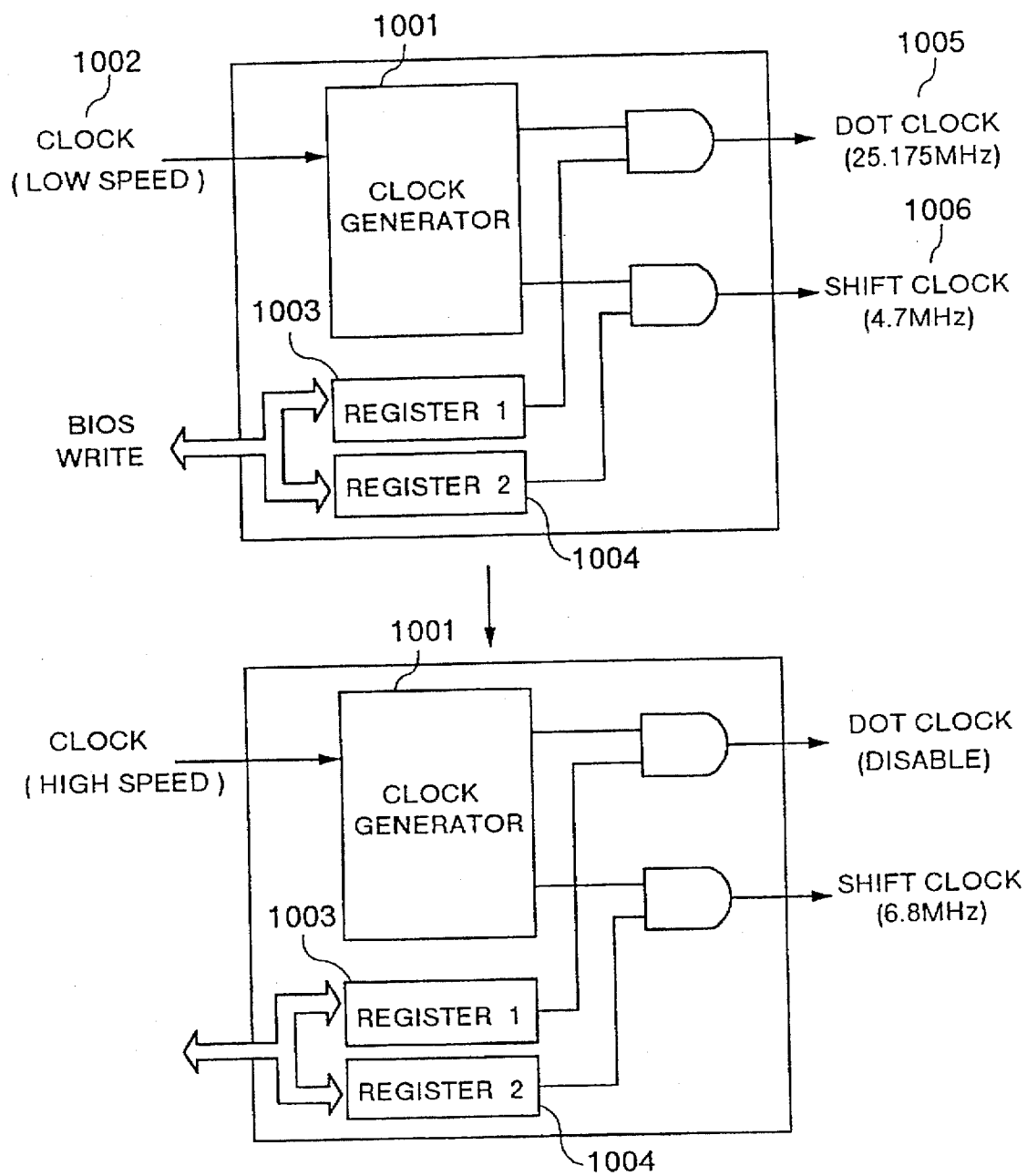
FIG. 10 shows the construction and operation of another clock generator in another embodiment of the present invention.

The display signal control system of the present invention can be accomplished by an apparatus shown in FIG. 10, too. A clock source which can change the frequency in accordance with the command of the CPU 1 is used as the clock source for generating the basic clock 1002. For example, the clock source can generate several frequencies and can selectively output any of them in accordance with the command of the CPU 1. A clock generator 1001 is similar to the clock generator 91 (shown in FIG. 9) and determines the frequencies of the dot clock 1005 and the shift clock 1006 in proportion to the frequency of the input clock namely, the clock 1002. When the frequency of the clock 1002 becomes twice under the control of the CPU 1, the frequencies of the dot clock 1005 and the shift clock 1006 as the outputs become also twice.

The CPU 1 writes the value determined by the selection result on the setup screen into the CRT enable register 1003 and the liquid crystal enable register 1004 in the display controller during execution of the setup routine. In this case, it is assumed that the logic "1" is written into the selected display.

For instance, when both of the CRT display 6 and the liquid crystal display 5 are set to ON on the setup screen, "1" is written into both enable registers. Further, a low speed clock is input to the clock 1002 which in turn is input to the display controller 7, under the control of the CPU 1, and the frequencies of the dot clock 1005 and the shift clock 1006 become 25.175 MHz and 4.7 MHz, respectively.

In contrast, when only the liquid crystal display 5 is selected, the CPU 1 writes "1" into the liquid crystal enable register 1004 and "0" into the CRT enable register 1003. At the same time, a high speed clock is input to the clock 1002 under the control of the CPU 1 and the clock generator 1001 generates the dot clock. However, because the logical product (AND) is calculated with the CRT enable register, this dot clock is invalidated. The clock generator 1001 generates the shift clock at the frequency of 6.8 MHz. The logical product of this output is calculated with the liquid crystal enable register, and the output is not invalidated. Accordingly, when only the liquid crystal display 5 is used, flicker of the screen can be suppressed.

Figure 11:
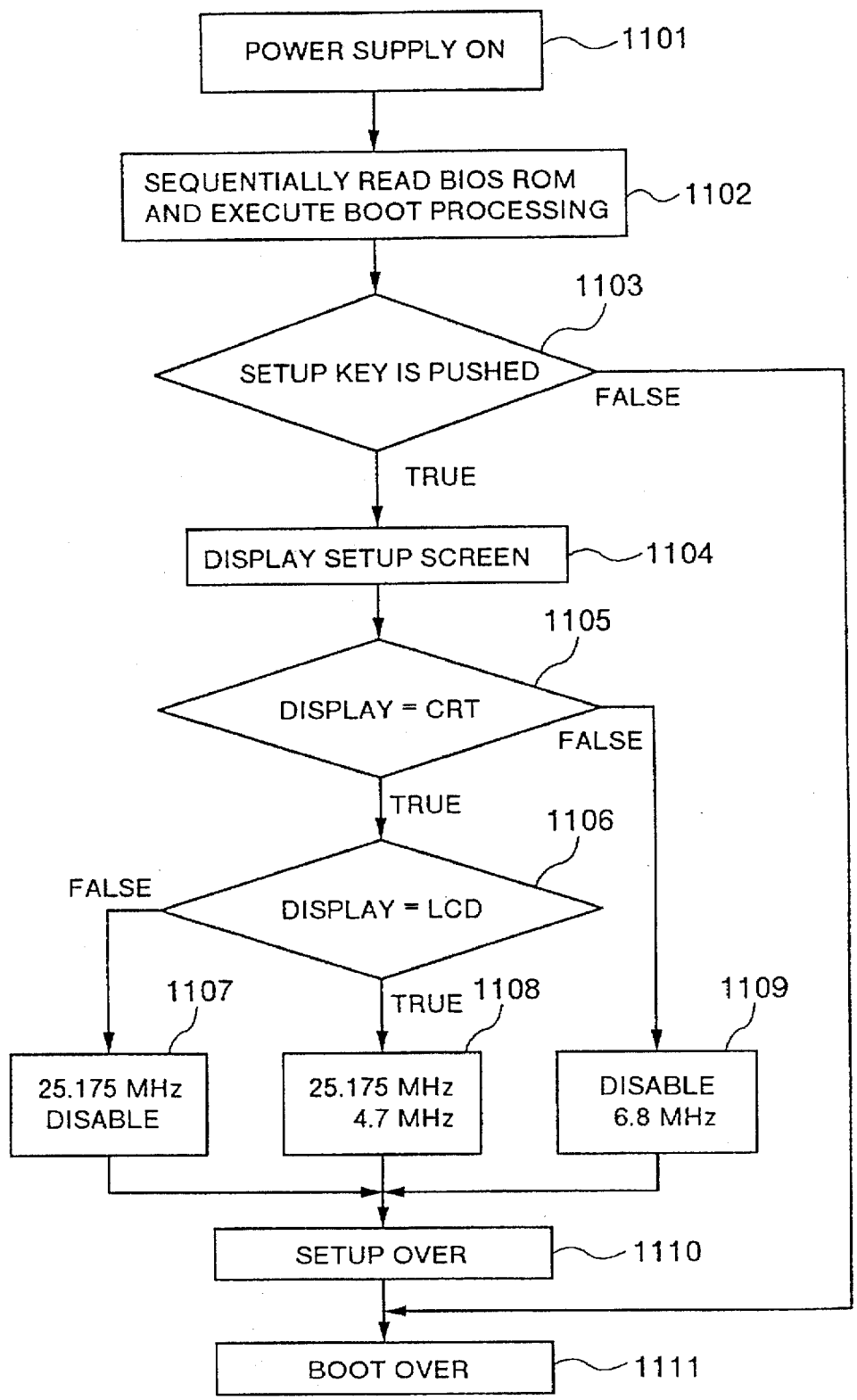
FIG. 11 is a flowchart showing an algorithm for converting a display frequency in still another embodiment of the present invention.

FIG. 11 is a flowchart collectively showing the flow of the operations described above. The flowchart of FIG. 11 will be explained. First, the power supply of the personal computer 21 is turned ON (step 1101). After turning on the power supply, the CPU 1 sequentially reads out the commands stored in the BIOS ROM 2 and executes them to execute the boot processing (step 1102).

When the key requiring the setup screen on the keyboard is pushed during the execution of the boot processing (step 1103 is true), the setup screen is displayed (step 1104). When the CRT display 6 is selected as the display on the setup screen (step 105 is true) and moreover, when the liquid crystal display 5, too, is selected (step 1106 is true), the display controller 7 generates the dot clock and the shift clock at the frequencies of 25.175 MHz and 4.7 MHz, respectively (step 1108).

When the LCD is not selected as the display (step 1106 is false), the display controller 7 invalidates the shift clock and generates the dot clock having a frequency of 25.175 MHz (step 1107). Further, when the CRT is not selected as the display (step 1105 is false), the display controller 7 invalidates the dot clock and generates the shift clock having a frequency of 6.8 MHz (step 1109). After the processing which determines the specification of the dot clock and the shift clock is completed, the setup processing is finished (step 1110), and the boot processing is thus completed (step 1111).

When both of the CRT display 6 and the liquid crystal display 5 are not selected during selection of the displays on the setup screen, warning may be outputted as being improper to the user, or a program may be prepared in advance so that any of them should be selected. For instance, programming may be made so that when either one of them is turned OFF, the other is not turned OFF. Alternatively, non-selection of both of them may be clearly described as an inhibit item in the manual, etc.

Figure 12:
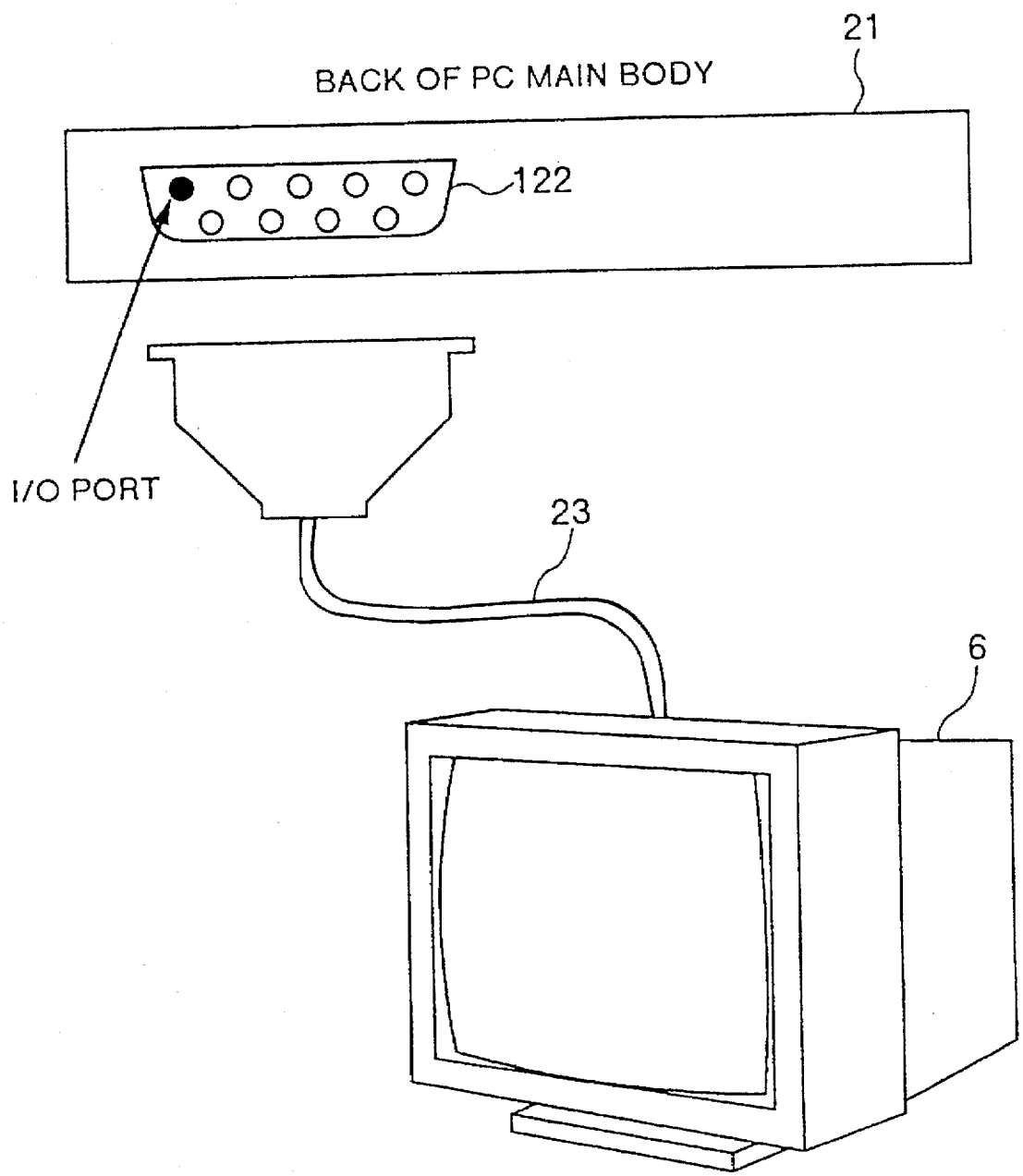
FIG. 12 shows an example of the connection detection method of the CRT display in still another embodiment of the present invention.

FIG. 12 shows still another embodiment of the present invention. In FIG. 12, reference numeral 122 denotes one of the connecters as the accessorial components of the personal computer 21 shown in FIG. 2. It is a CRT connector for outputting the display signal to the CRT display 6. One of the I/O addresses is allocated to one of the pins of the connecter 122 and is used as an I/O port. When the CRT display 6 is connected and when not, the voltage levels are made different. The CPU 1 reads the I/O port allocated to one of the pins of the connecter 122 and determines connection/disconnection of the CRT display 6 in accordance with the difference of the voltage levels. Here, when the CRT display 6 is connected, the level is assumed to be the High level and when not, the Low level.

When detecting the High level of the I/O port, the CPU 1 determines that the CRT display 6 is connected and writes the value such that the clock generator 91 outputs the dot clock and the shift clock having frequencies of 25.175 MHz and 4.7 MHz, respectively, into the register 92 inside the display controller 7 shown in FIG. 9. In contrast, when the CPU 1 detects the Low level of the I/O port, it determines that the CRT display 6 is not connected and writes the value such that the clock generator 91 invalidates the dot clock and outputs the shift clock having a frequency of 6.8 MHz, into the register 92 in the display controller shown in FIG. 9. In this way, the user needs not execute any particular processing when the CRT display is not used, and flicker of the screen can be suppressed.

When the CPU 1 detects the High level of the I/O port, it determines that the CRT display 6 is connected, and writes "1" into the liquid crystal enable register 1004 and the CRT enable register 1003 inside the display controller 7 shown in FIG. 10. In this case, the low speed clock is input as the clock 1002. Accordingly, the frequencies of the dot clock and the shift clock are 25.175 MHz and 4.7 MHz, respectively, and simultaneous display of the same screen on both CRT display 6 and liquid crystal display 5 can be accomplished. In contrast, when the CPU 1 detects the Low level of the I/O port, it determines that the CRT display 6 is not connected, and writes "1" into the liquid crystal enable register 1004 and "0" into the CRT enable register 1003 inside the display controller 7 shown in FIG. 10. In this way, the high speed clock is inputted to the clock 1002. As a result, the dot clock is invalidated and the shift clock having a frequency of 6.8 MH is output. Accordingly, when the CRT display 6 is not used, it is not necessary for the user to execute any specific processing, and flicker of the screen can be suppressed.

Figure 13:
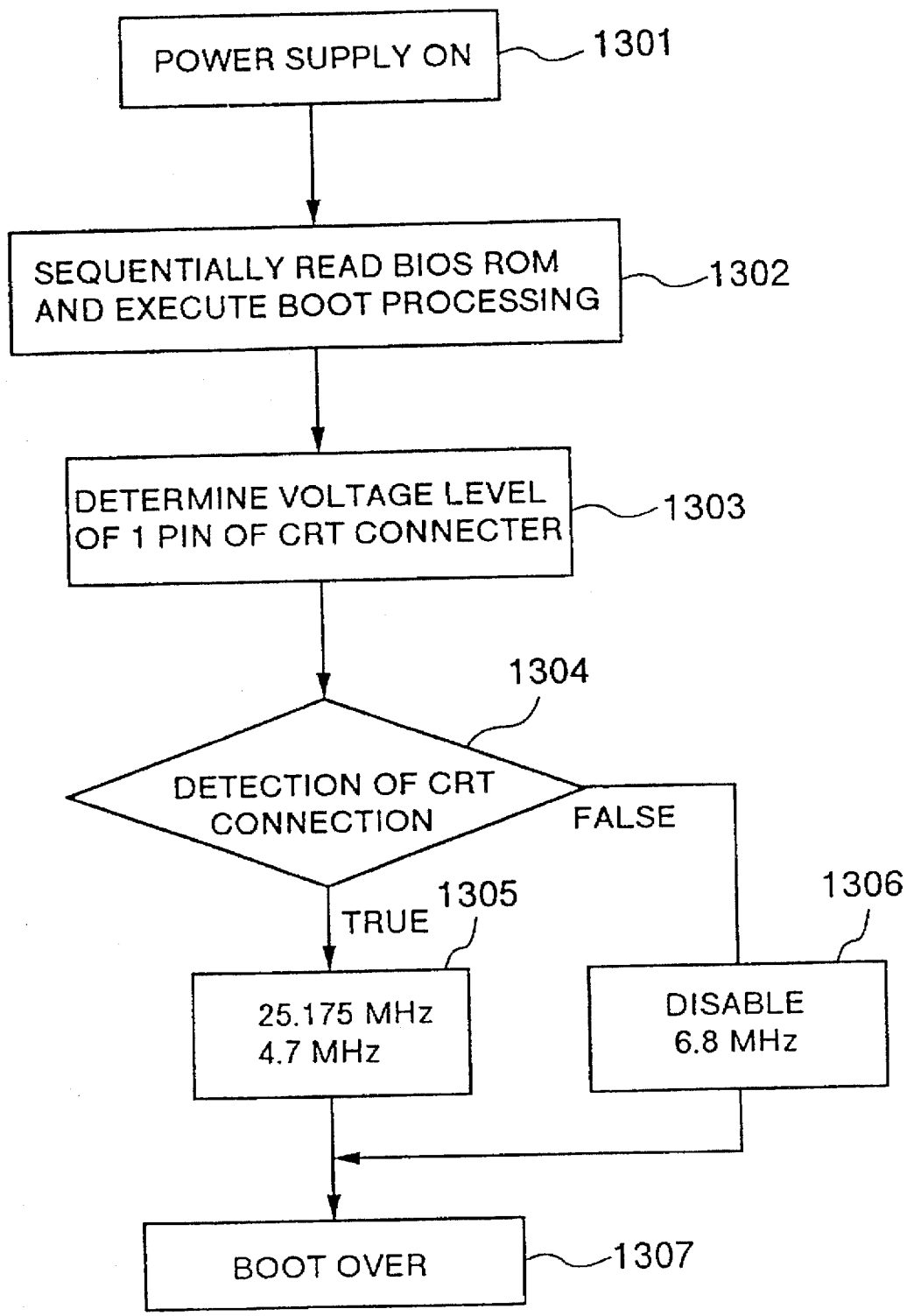
FIG. 13 is a flowchart for effecting frequency conversion in still another embodiment of the present invention.
Figure 14:
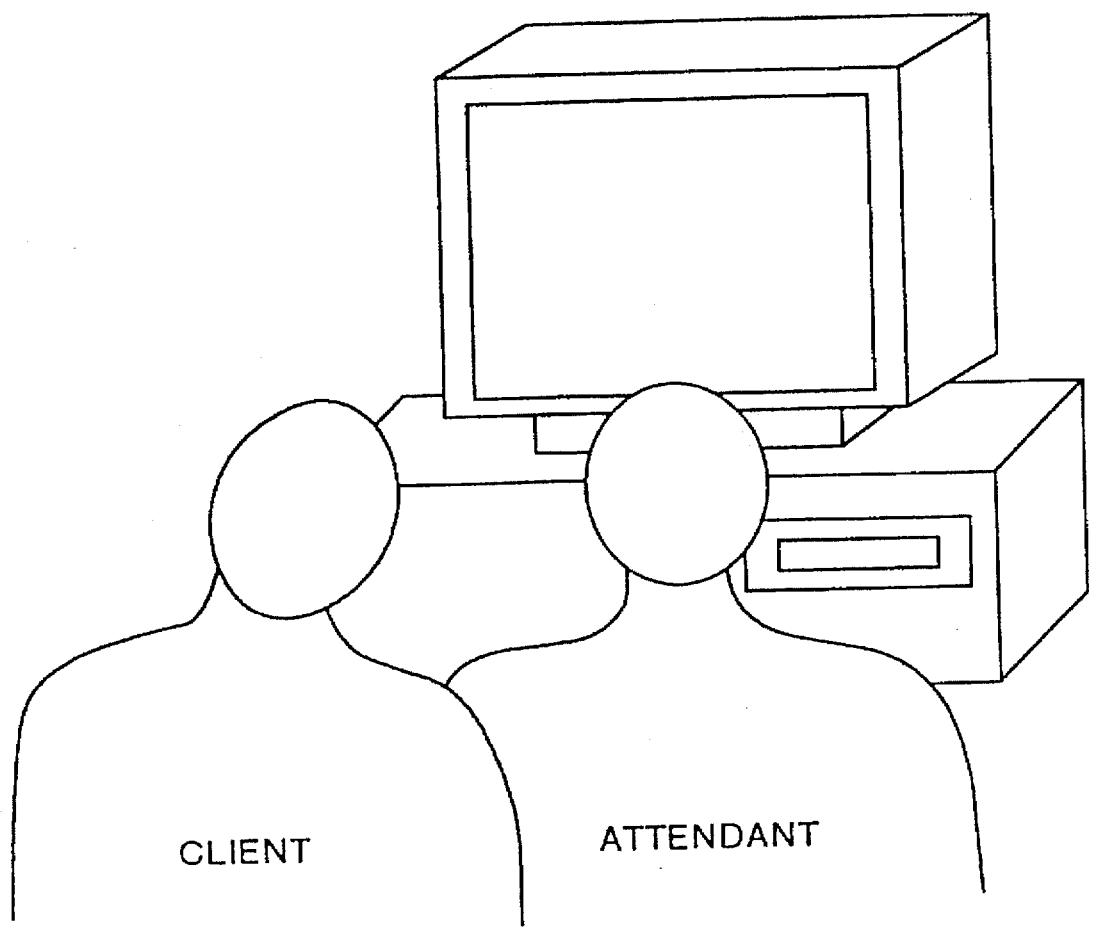
FIG. 14 shows a conventional method of using a terminal.
Figure 15:
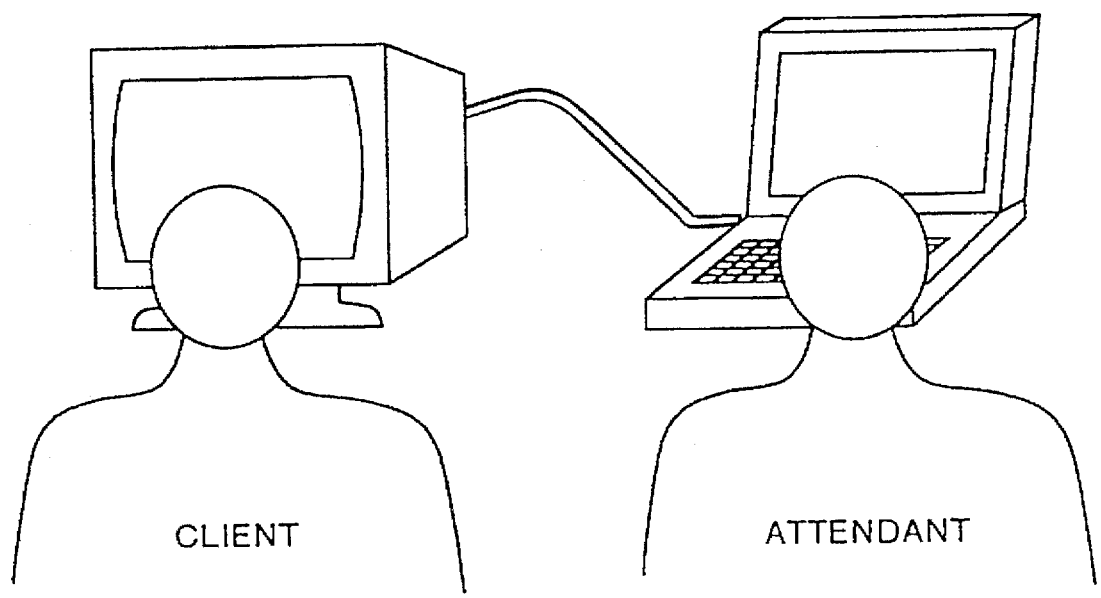
FIG. 15 shows a method of utilizing a terminal according to the present invention.

The flowchart of FIG. 13 collectively shows the flow of the operations described above. This flowchart will be explained. First, the power supply is turned ON (step 1301). After turning on the power supply, the CPU 1 sequentially reads out the commands stored in the BIOS ROM 2 and executes them to execute the boot processing (step 1302). The CPU 1 reads the I/O port allocated to one of the pins of the CRT connecter and determines the voltage level (step 1303). When the CPU 1 detects the connection of the CRT as a result of determination of the voltage level (step 1304 is true), the display controller 7 generates the dot clock and the shift clock having frequencies of 25.175 MHz and 4.7 MHz, respectively (step 1305). When the CPU 1 detects disconnection of the CRT display device (step 1304 is false), the display controller 7 invalidates the dot clock and generates the shift clock having a frequency of 6.8 MHz (step 1306). After the processing for determining the specification of the dot clock and the shift clock is finished, the boot processing is finished (step 1307).

In the foregoing description, the CRT display 6 is assumed to be connected when the voltage level of the I/O port is High and disconnected when the voltage level is Low, but the present invention can of course be applied to the opposite case. As the method of detecting connection/ disconnection of the CRT display 6, the foregoing explanation uses the method which allocates the I/O address to one of the pins of the connecter to use it as the I/O port and determines connection/disconnection from the voltage level of the I/O port, but the present invention can of course be practiced by using other detection methods. For instance, it is possible to use a method which causes a weak current to flow through one of the pins of the connecter.

Next, the method which can start display of the same screen on the CRT display without again starting up the system in the first embodiment, will be explained with reference to FIGS. 1 and 9.

The display specification set commands to the display controller 7 for the first case where both liquid crystal display 5 and the CRT display 6 are used and for the second case where only the liquid crystal display 5 is used are stored in advance in the HD 8 and the BIOS ROM 2 shown in FIG. 1, respectively.

When the attendant uses only the liquid crystal display 5, the display specification set command for the second case is executed for the liquid controller 7. Therefore, the clock generator 91 in the display controller 7 invalidates the display signal for the CRT display 6 and generates the display signal having a frequency of 6.8 MHz for the liquid crystal display 5.

When a client appears, the display specification set command in the first case, which is stored in the HD 8, is executed for the display controller 7. More concretely, when a certain kind of command is inputted through the keyboard, the processing described above (that is, the processing for writing a value such that the clock generator 91 generates the dot clock and the shift clock having frequencies of 25.175 MHz and 4.7 MHz, respectively, into the register 92 inside the display controller 7) may be executed. Alternatively, the arrangement may be employed such that when a predetermined icon, menu, or the like, is clicked by an input device such as a mouse, a track ball, etc, the CPU 1 executes the processing described above.

Alternatively, the display specification setting commands (for both of the first and second cases) may be stored in advance in each of the HD 8 and the BIOS ROM 2.

The display specification set command for either first or second case is sequentially read out from the BIOS ROM 2 and is executed in accordance with the kind of the displays used during the system start-up processing after turn-on of the power supply.

To change the display specification after the start-up of the system, this change can be made by executing the display specification set command stored in the HD 8.

In this way, the access need not be made to the BIOS ROM 2 after the start-up of the system (during the execution of the application program). It is well known that the access to the BIOS ROM during the execution of the application program is likely to invite various problems.

Incidentally, there are a large number of conventional BIOS ROMs which can cope only with the mode using the liquid crystal display alone (the second case described above). In order to let the CRT display, too, display the same screen in such a case, the content of the BIOS ROM must be changed. Therefore, the display specification setting commands for both the first and second cases are stored in the HD 8. The display specification can be changed by executing the commands in the HD 8. In this way, it becomes necessary only to install the program of the display specification setting commands to the HD without the necessity for rewriting the BIOS ROM or for exchanging it.

The clock generator 91 in the display controller 7 which sets the command described above to the register 92 lowers the frequency of the display signal to the liquid crystal display 5 to 4.7 MHz and generates afresh the display signal to the CRT display 6. In this case, the frequency of the display signal to the CRT display 6 becomes 25.175 MHz. The procedure explained with reference to FIGS. 9 and 10 may be employed as the procedures for setting the frequency of the display signal to each display by the display controller 7.

When the processing described above is executed, the display by using only the liquid crystal display 5 can be shifted to the simultaneous display by both the CRT display 6 and the liquid crystal display 5 without the necessity for turning OFF the power supply.

Figure 16:
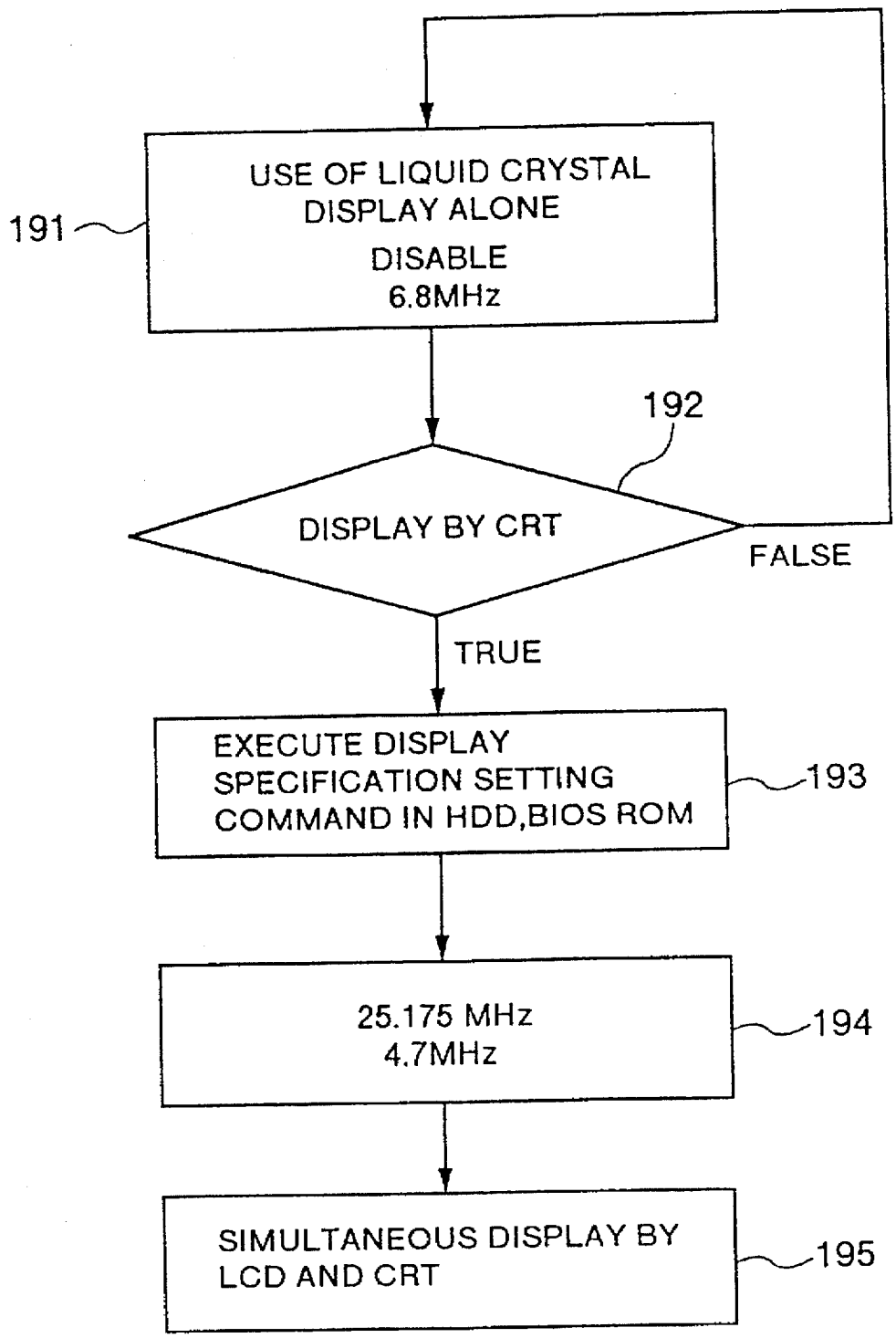
FIG. 16 is a flowchart for switching a display in still another embodiment of the present invention.

The flowchart of FIG. 16 collectively shows the flow of the operations described above. First, the user uses the personal computer 21 by the liquid crystal display 5 alone, and the display signals to the CRT display 6 such as the dot clock are invalidated. The frequency of the shift clock to the liquid crystal display is 6.8 MHz (step 191). When the client appears and the same screen needs be displayed on the CRT display 6, too (step 192 is true), the display specification setting command stored in the HD 8 is executed for the display controller 7 (step 193). Here, the display specification is the one that simultaneously displays the same screen on both the CRT display 6 and the liquid crystal display 5. When this command is executed, the display controller 7 generates a dot clock having a frequency of 25.175 MHz to the CRT display 6 and lowers the frequency of the shift clock to the liquid crystal display 5 to 4.7 MHz (step 194). As a result, the same screen is simultaneously displayed on the CRT display 6 and the liquid crystal display (step 195).

The display specification set command in the HD 8 in the embodiments described above may be stored in the BIOS ROM, as well.

In the foregoing description, the explanation has been given on the case where the dot clock to the CRT display 6 and the shift clock to the liquid crystal display have certain specific frequencies, respectively, but the present invention is not necessarily limited to such an arrangement. The display frequency may the one that is suitable for each display. The frequency of the shift clock when only the liquid crystal display 5 is used may be the frequency which does not generate flicker.

In the foregoing description, display resolution has been described as 640 dots by 480 lines, but the present invention is not particularly limited to such resolution and can accomplish higher resolution by adjusting the frequencies of the dot clock and shift clock.

According to the present invention described above, the display signal having the frequency in accordance with the selected display is generated by the display controller at the time of setup. In this way, the user of the personal computer can simultaneously display the same display screen on both the CRT display and the liquid crystal display by merely designating the display at the time of setup. Further, when the liquid crystal display alone is used, a high quality screen devoid of flicker can be accomplished.

According to the present invention, connection/ disconnection of the CRT display can be detected from the connector for connecting the CRT display. Further, the display controller generates the display signal having the frequency in accordance with connection/disconnection of the CRT display. Accordingly, the user of the personal computer can make optimum display in accordance with a given situation without the need of specific processing.

According to the present invention, further, the display used can be switched without the necessity for re-activating the system. More concretely, when a client appears at the counter of a stock company, an insurance company, etc., while only the liquid crystal display is used and when the same screen must be displayed on the CRT display, too, the same screen can be instantaneously displayed on the CRT display. For this reason, the present invention provides also the effect that the client need not wait for a long time.

We claim:

1. An information processing unit comprising:
   a central processing unit;
   a non-volatile memory for storing a start-up processing of said information processing unit;
   a main memory;
   a liquid crystal display; and
   a display controller for generating at least one of a display signal for said liquid crystal display and a display signal for a cathode ray tube display, and controlling the frequency of the display signals generated; wherein:
   said central processing unit displays a setup screen for determining a device specification including an item for allowing a user to select whether or not each of said liquid crystal display and said cathode ray tube display is to be used, on said liquid crystal display during the start-up processing of said information processing unit, controls said display controller in accordance with the result of said selection and changes the frequency of said display signal of at least said liquid crystal display.

2. An information processing unit according to claim 1, wherein said display signal frequency to said liquid crystal display is controlled such that, comparing a first case where both of said liquid crystal display and said cathode ray tube display are selected with a second case where only said liquid crystal display is selected, said display signal frequency is higher in the second case.

3. An information processing unit according to claim 2, wherein frequency setting commands for said display controller in the first case where both of said liquid crystal display and said cathode ray tube display are selected and in the second case where only said liquid crystal display is selected are stored in advance in said non-volatile memory at the time of setup, said central processing unit executes said setting command for the first case or said setting command for the second case stored in said non-volatile memory for said display controller in accordance with the selection result of setup, and said display controller generates a display signal having a frequency corresponding to said set command and outputs said display signal to said liquid crystal display.

4. An information processing unit according to claim 1, wherein frequency setting commands for said display controller in the first case where both of said liquid crystal display and said cathode ray tube display are selected and in the second case where only said liquid crystal display is selected are stored in advance in said non-volatile memory at the time of setup, said central processing unit executes said setting command of the first case or said set command of the second case stored in said non-volatile memory for said display controller in accordance with the selection result of setup, and said display controller generates a display signal having a frequency corresponding to said set command and outputs said display signal to said liquid crystal display.

5. A user interface method comprising the steps of:
   displaying, on a display, a request for causing a user to select whether or not setup for determining a specification of an information processing unit is to be used, during start-up processing of said information processing unit;
   displaying a setup screen on said display when the use of setup is selected, wherein said setup screen includes an item for allowing said user to select whether or not each of a liquid crystal display and a cathode ray tube display is to be used; and
   generating a message representing that the selection is improper when the result of the selection represents that both of said liquid crystal display and said cathode ray tube display are not used.

6. A user interface method comprising the steps of:
   displaying, on a display, a request for allowing a user to select whether or not setup for determining a specification of an information processing unit is to be used, during a start-up processing of said information processing unit;
   displaying a setup screen on said display when the use of setup is selected, wherein said setup screen includes an item for allowing said user to select whether or not each of a liquid crystal display and a cathode ray tube display is to be used; and
   controlling, by a central processing unit, a display controller for generating at least one of the display signals for said liquid crystal display and said cathode ray tube display and controlling the frequency of the display signal generated, to thereby change the frequency of the display signal to said liquid crystal display.

7. A user interface method according to claim 6, wherein said display signal frequency to said liquid crystal display is controlled such that, comparing a first case where both of said liquid crystal display and said cathode ray tube display are selected with a second case where only said liquid crystal display is selected, said display frequency is higher when said second case is selected.

8. An information processing unit comprising:
   a central processing unit;
   a non-volatile memory for storing a start-up processing of said information processing unit;
   a main memory;
   a liquid crystal display; and
   a display controller for generating at least one of a display signal to said liquid crystal display and a display signal to a cathode ray tube display and controlling the frequency of said display signals generated;
   wherein said central processing unit includes means for detecting whether or not said cathode ray tube display is connected to said information processing unit, during start-up of said information processing unit, and said display signal frequency to at least said liquid crystal display is changed depending upon whether said cathode ray tube display is connected or not.

9. An information processing unit according to claim 8, wherein said means for detecting detects the connection of said cathode ray tube display by a voltage or a current of one of the pins of a connecter for connecting said cathode ray tube display to said information processing unit.

10. An information processing unit according to claim 9, wherein said display signal frequency to said liquid crystal display is changed in such a manner as to become higher in the case where said cathode ray tube display is not connected than in the case where said cathode ray tube display is connected.

11. An information processing unit according to claim 8, wherein frequency setting commands to said display controller in a first case where said cathode ray tube display is connected and in a second case where said cathode ray tube display is not connected are stored in advance in said non-volatile memory, said central processing unit executes said setting command in the first case or said set command in the second case stored in said non-volatile memory for said display controller in accordance with the connection of said cathode ray tube display, and said display controller generates a display signal having a frequency corresponding to the executed setting command and outputs said display signal to said liquid crystal display.

12. An information processing unit according to claim 11, wherein said display signal frequency to said liquid crystal display is changed in such a manner as to become higher in the second case than in the first case.

13. An information processing unit comprising:

a central processing unit;

a non-volatile memory-for storing a start-up processing to said information processing unit;

a main memory;

a liquid crystal display;

a display controller for generating at least one of a display signal to said liquid crystal display and a display signal to a cathode ray tube display, and controlling the frequency of the generated display signal;

wherein:

display specification setting commands to said display controller in a first case where both of said liquid crystal display and said cathode ray tube display are used and in a second case where only said liquid crystal display is used are stored in advance in said non-volatile memory, respectively, and when a necessity for displaying the same screen on said cathode ray tube display, too, arises while only said liquid crystal display is used in said second case, said CPU executes said display specification setting command in said first case, stored in said non-volatile memory, for said display controller and said display controller changes the frequency of said display signal to said liquid crystal display and generates said display signal to said cathode ray tube display.

14. An information processing unit according to claim 13, wherein the frequency of said display signal to said liquid crystal display is controlled in such a manner as to become higher in the second case than in the first case.

15. An information processing unit comprising:

a central processing unit;

a non-volatile memory for storing an initiation processing of said information processing unit;

a main memory;

a liquid crystal display;

a display controller for generating at least one of a display signal to said liquid crystal display and a display signal to a cathode ray tube display and controlling the frequency of the generated display signals; and an external memory;

wherein:

said external memory stores in advance display specification setting commands to said display controller in a first case where both of said liquid crystal display and said cathode ray tube display are used, said non-volatile memory stores in advance display specification setting commands to said display controller in a second case where only said liquid crystal display is used, when a necessity for displaying the same screen on said cathode ray tube display, too, arises while only said liquid crystal display is being used in said second case, said CPU reads out said display specification setting commands in the first case, stored in said external memory, and executes the display specification setting command for said display controller, and said display controller changes the frequency of said display signal to said liquid crystal display and generates said display signal to said cathode ray tube display.

16. An information processing unit according to claim 15, wherein the frequency of said display signal to said liquid crystal display is lower in said first case than in said second case.

17. An information processing unit comprising:

a central processing unit;

a non-volatile memory for storing a start-up processing of said information processing unit;

a main memory;

a liquid crystal display;

a display controller for generating at least one of a display signal to said liquid crystal display and a display signal to a cathode ray tube display and controlling the frequency of the generated display signal; and an external memory;

wherein:

a display specification setting command to said display controller in a first case where both of said liquid crystal display and said cathode ray tube display are used and a display specification setting command to said display controller in a second case where only said liquid crystal display is used are stored in advance in each of said non-volatile memory and said external memory, said CPU reads and executes said display specification setting command for either one of said first and second cases from said non-volatile memory in accordance with the kind of the display used, during the start-up processing of said information processing unit, and when a necessity for changing said display specification arises after the start-up of said information processing unit, said CPU executes said display specification setting command stored in said external memory.

18. An information processing unit comprising:

a central processing unit;

a non-volatile memory for storing a start-up processing of said information processing unit;

a main memory;

a liquid crystal display;

a display controller for generating at least one of a display signal to said liquid crystal display and a display signal to a cathode ray tube display, and controlling the frequency of each of the general display signals; and an external memory;

wherein:

said external memory stores therein in advance a display specification setting command to said display controller in a first case where both of said liquid crystal display and said cathode ray tube display are used and a display specification setting command to said display controller in a second case where only said liquid crystal display is used, said non-volatile memory stores therein said display specification setting command in said second case, and when a necessity for changing said display specification arises while said information processing system operates in either one of said first and second cases, said CPU executes either of said display specification setting commands stored in said external memory for said display controller.

* * * * *